United States Patent
Ma

(10) Patent No.: US 12,528,339 B2
(45) Date of Patent: Jan. 20, 2026

(54) GLASS ASSEMBLY AND WINDOW ASSEMBLY

(71) Applicant: SAINT-GOBAIN GLASS FRANCE, Courbevoie (FR)

(72) Inventor: Siteng Ma, Shanghai (CN)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 0 days.

(21) Appl. No.: 18/852,981

(22) PCT Filed: Apr. 4, 2023

(86) PCT No.: PCT/CN2023/086118
§ 371 (c)(1),
(2) Date: Sep. 30, 2024

(87) PCT Pub. No.: WO2023/193697
PCT Pub. Date: Oct. 12, 2023

(65) Prior Publication Data
US 2025/0214397 A1   Jul. 3, 2025

(30) Foreign Application Priority Data
Apr. 6, 2022  (CN) .......................... 202210358088.9

(51) Int. Cl.
*B60J 1/00*  (2006.01)
*B32B 17/10*  (2006.01)
(Continued)

(52) U.S. Cl.
CPC ......... *B60J 1/001* (2013.01); *B32B 17/10036* (2013.01); *B32B 17/1044* (2013.01);
(Continued)

(58) Field of Classification Search
CPC ....... B32B 2605/08; B60J 1/001; B60Q 3/208
See application file for complete search history.

(56) References Cited

U.S. PATENT DOCUMENTS

2013/0299856 A1* 11/2013 Verger .............. B32B 17/10541
438/27
2016/0349442 A1* 12/2016 Berard .............. B32B 17/10018
(Continued)

FOREIGN PATENT DOCUMENTS

| CN | CN 1890588 A | 1/2007 |
|---|---|---|
| CN | CN 104802622 A | 7/2015 |

(Continued)

OTHER PUBLICATIONS

International Search Report as issued in International Patent Application No. PCT/CN2023/086118, dated Jul. 12, 2023.

*Primary Examiner* — Keith G. Delahoussaye
(74) *Attorney, Agent, or Firm* — Pillsbury Winthrop Shaw Pittman LLP

(57) ABSTRACT

A glass assembly includes a first glass body having a first surface and a second surface which are oppositely arranged; a second glass body having a third surface facing the second surface and a fourth surface arranged oppositely; a light extraction component sandwiched between the first glass body and the second glass body and including a light extraction structure for extracting light, and an interlayer directly attached to the light extraction component, and the refractive index of the interlayer is smaller than that of an adjacent layer in the direction toward the second glass body, so that incident light introduced from the second glass body is totally reflected toward the second glass body and at least totally reflected in the second glass body.

20 Claims, 4 Drawing Sheets

(51) Int. Cl.
  *B32B 27/08* (2006.01)
  *B32B 27/36* (2006.01)
  *B60Q 1/26* (2006.01)
  *B60Q 3/208* (2017.01)
  *F21V 8/00* (2006.01)

(52) U.S. Cl.
  CPC .......... *B32B 17/10541* (2013.01); *B32B 17/10761* (2013.01); *B32B 17/10798* (2013.01); *B32B 27/08* (2013.01); *B32B 27/36* (2013.01); *B32B 27/365* (2013.01); *B60Q 1/268* (2013.01); *B60Q 3/208* (2017.02); *G02B 6/0013* (2013.01); *G02B 6/005* (2013.01); *B32B 2315/08* (2013.01); *B32B 2329/06* (2013.01); *B32B 2383/00* (2013.01); *B32B 2605/08* (2013.01)

(56) References Cited

U.S. PATENT DOCUMENTS

| | | | |
|---|---|---|---|
| 2018/0086028 A1* | 3/2018 | Berard | B60Q 1/268 |
| 2020/0147935 A1* | 5/2020 | Patrickson | B32B 17/10761 |
| 2020/0230921 A1* | 7/2020 | Yoshida | B32B 17/10633 |
| 2021/0101453 A1 | 4/2021 | Pohlen | |
| 2022/0221626 A1* | 7/2022 | Diguet | B32B 7/06 |
| 2023/0400619 A1* | 12/2023 | Ma | B60Q 3/208 |
| 2024/0004121 A1* | 1/2024 | Kingman | G02B 6/0051 |

FOREIGN PATENT DOCUMENTS

| | | |
|---|---|---|
| CN | CN 111765405 A | 10/2020 |
| CN | 114025954 A | 2/2022 |
| JP | JP 2010-202442 A | 9/2010 |
| JP | JP 2016-009271 A | 1/2016 |

\* cited by examiner

GLASS ASSEMBLY AND WINDOW ASSEMBLY

CROSS-REFERENCE TO RELATED APPLICATIONS

This application is the U.S. National Stage of PCT/CN2023/086118, filed Apr. 4, 2023, which in turn claims priority to Chinese patent application number 202210358088.9 filed Apr. 6, 2022. The content of these applications are incorporated herein by reference in their entireties.

FIELD

The present disclosure relates to the technical field of glass, in particular to a glass assembly and a window assembly using the same.

BACKGROUND

With the rapid development of automobile industry and the increasing demand of consumers for vehicle functions, luminous glass with lighting effect has been widely valued by vehicle manufacturers and favored by the consumers. The luminous glass in active luminescent mode is expensive, which is not conducive to universal implementation. Therefore, in the luminous glass with lighting effect, it usually forms a pattern area by laminating a microstructure film layer into the glass, and when incident light emitted by light source arranged on the side or bottom of the glass or integrated in the glass is projected to the pattern area, the light is scattered or diffused to emerge through the pattern area due to the change of the surface structure, thus achieving different luminous effects.

SUMMARY

The present disclosure aims to provide a glass assembly with enhanced luminous function, which optimizes light extraction performance, thereby improving illumination performance and enhancing user experience.

To this end, according to one aspect of the present disclosure, a glass assembly is provided. The glass assembly comprises a first glass body having a first surface and a second surface which are oppositely arranged; a second glass body having a third surface facing the second surface and a fourth surface arranged oppositely; a light extraction component sandwiched between the first glass body and the second glass body and comprising a light extraction structure for extracting light; wherein the glass assembly comprises an interlayer directly attached to the light extraction component, and the refractive index of the interlayer is smaller than that of an adjacent layer in the direction toward the second glass body, so that incident light introduced from the second glass body is totally reflected toward the second glass body and at least totally reflected in the second glass body.

According to the above technical concept, the embodiment of the present disclosure may further include any one or more of the following alternative forms.

In some alternative forms, the light extraction component is a light extraction film sandwiched between the first glass body and the second glass body through a first intermediate layer, the first intermediate layer is attached at least between the light extraction component and the second glass body, and the incident light is totally reflected at least in the second glass body and the first intermediate layer.

In some alternative forms, a second intermediate layer is attached between the light extraction component and the first glass body, and the second intermediate layer is formed as the interlayer; and wherein the refractive index of the second intermediate layer is at least smaller than that of the light extraction component, and the incident light is totally reflected in the light extraction component, the first intermediate layer and the second glass body.

In some alternative forms, the second intermediate layer is selected from polyvinyl butyral, ethylene-vinyl acetate copolymer or acrylic resin.

In some alternative forms, the light extraction structure is arranged toward the first glass body or the second glass body.

In some alternative forms, the light extraction component is attached with a coating, and the coating is formed as the interlayer; and wherein the refractive index of the coating is smaller than the refractive index of the light extraction component and/or the refractive index of the first intermediate layer.

In some alternative forms, the coating fills the light extraction structure and the light extraction structure is arranged toward the first glass body; and wherein the incident light is totally reflected in the light extraction component, the first intermediate layer and the second glass body.

In some alternative forms, the coating is polysiloxane.

In some alternative forms, the coating is applied following the contour of the light extraction structure, and the light extraction structure is arranged toward the first glass body; and wherein the incident light is totally reflected in the light extraction component, the first intermediate layer and the second glass body.

In some alternative forms, the coating is applied following the contour of the light extraction structure, and the light extraction structure is arranged toward the second glass body; and wherein the incident light is totally reflected in the first intermediate layer and the second glass body.

In some alternative forms, the coating is silicon dioxide.

In some alternative forms, the glass assembly comprises a light source arranged adjacent to the edge of the first glass body and/or the second glass body or arranged at the bottom of the second glass body or embedded in the second glass body.

In some alternative forms, the glass assembly comprises a light guiding component configured to conduct the incident light at least toward the second glass body and the light extraction structure of the light extraction component.

According to another aspect of the present disclosure, a glass assembly is provided. The glass assembly comprises a first glass body having a first surface and a second surface which are oppositely arranged; a second glass body having a third surface facing the second surface and a fourth surface arranged oppositely; a light extraction component sandwiched between the first glass body and the second glass body and comprising a light extraction structure for extracting light; wherein the refractive index of the light extraction component is smaller than that of an adjacent layer in the direction toward the second glass body, so that incident light introduced from the second glass body is totally reflected toward the second glass body and at least totally reflected in the second glass body.

In some alternative forms, the light extraction component is a light extraction film sandwiched between the first glass body and the second glass body through a first intermediate layer, the first intermediate layer is at least attached between the light extraction component and the second glass body, and the light extraction structure is arranged toward the second glass body; and wherein the refractive index of the light extraction component is smaller than that of the first intermediate layer, and the incident light is totally reflected in the first intermediate layer and the second glass body.

According to another aspect of the present disclosure, a window assembly is provided. The window assembly comprises the above glass assembly, wherein the window assembly comprises door, window, curtain wall, vehicle window glass, airplane glass or ship glass.

In some alternative forms, the window assembly is a vehicle window glass comprises front windshield, rear windshield, skylight glass, vehicle door glass or corner window glass, wherein the first surface of the first glass body faces the outside of the vehicle and the fourth surface of the second glass body faces the inside of the vehicle.

The glass assembly of the present disclosure can improve the illumination brightness, create a richer and more comfortable atmosphere and improve the user experience on the premise of not affecting the performance and aesthetics of the glass itself. The glass assembly of the present disclosure is easy to implement and has obvious performance improvement, and can be applied to various occasions through the combination of various ways to meet the diversified requirements of users.

BRIEF DESCRIPTION OF THE DRAWINGS

Other features and advantages of the present disclosure will be better understood by the following alternative embodiments described in detail in conjunction with the accompanying drawings, in which the same reference numerals identify the same or similar parts, in the drawings.

DETAILED DESCRIPTION OF EMBODIMENTS

Figure 1:
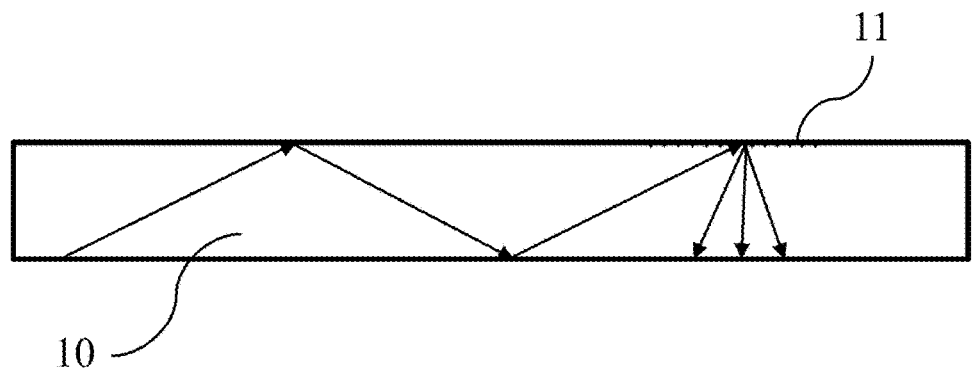
FIG. 1 is a schematic view of a lighting mode of a glass assembly, in which incident light is totally reflected in a light extraction film and then led out at a light scattering structure.

The implementation and use of the embodiments are discussed in detail below. However, it should be understood that the specific embodiments discussed merely exemplify the specific ways of implementing and using the present disclosure, and do not limit the scope of the disclosure. When describing the structural positions of various components, such as the directions of upper, lower, top, bottom, etc., the description is not absolute, but relative. When the various components are arranged as shown in the figures, these directional expressions are appropriate, but when the positions of the various components in the figures would be changed, these directional expressions would also be changed accordingly.

In this context, the expression "comprising" or similar expressions "including", "containing" and "having" which are synonymous are open, and do not exclude additional unlisted elements, steps or ingredients. The expression "consisting of . . . " excludes any element, step or ingredient that is not specified. The expression "consisting essentially of . . . " means that the scope is limited to the specified elements, steps or ingredients, plus the optional elements, steps or ingredients that do not materially affect the basic and new features of the claimed subject matter. It should be understood that the expression "comprising" covers the expressions "consisting essentially of" and "consisting of".

In this context, the terms "first", "second" and so on are not used to limit the sequence and the number of components unless otherwise stated.

In this context, the meanings of "a plurality of" and "multiple layers" refer to two or more than two, unless otherwise specified.

In this context, unless otherwise specified, the terms such as "installation", "connection" and "attach" should be understood broadly. For example, it can be fixed connection, detachable connection or integrated; it can be directly connected or indirectly connected through an intermediate medium, and it can be the internal communication of two components or the interaction between two components. For those skilled in the art, the specific meanings of the above terms in this context can be understood according to specific situations.

In this context, "glass" is an amorphous inorganic non-metallic material, which is generally made of a variety of inorganic minerals (such as quartz sand, borax, boric acid, barite, barium carbonate, limestone, feldspar, soda ash, etc.) as main raw materials, and a small amount of auxiliary raw materials. Its main components are silica and other oxides. In the described embodiments, unless otherwise specified, the thickness of the glass is the thickness commonly used in the art, and the thickness of each laminated structure on the glass is suitable for the conventional range, and is not limited as shown in the figures. In addition, although it is shown as plane glass in the figures, the glass of the present disclosure may also be curved glass. In various embodiments, it is described as an independent glass body or glass plate. However, in some cases, the surface of the glass can also use special coating to improve thermal insulation and/or comfort.

Hereinafter, the glass assembly applied to a vehicle window glass will be described, but it is not excluded that the glass assembly can be applied to other environments such as door, window, curtain wall, airplane glass or ship glass. When the glass assembly is used to describe the vehicle window glass of a vehicle, "outside" and "inside" refer to the directions relative to vehicle body, "outside" refers to the direction away from the vehicle body and "inside" refers to the direction facing the vehicle body. It should be understood that the vehicle window glass according to the embodiment of the present disclosure includes, but is not limited to, front windshield, rear windshield, skylight glass, vehicle door glass or corner window glass, which can provide different illumination effects based on different requirements.

In the ever-changing automobile industry, glass assembly with lighting and decorative effects have been widely used in such as vehicle skylight of mid-to-high-end vehicles, which can not only achieve the effects of light shading and/or color change, but also form lighting effects with different patterns by combining coatings and/or sandwich structures. For light extraction film or light guiding film laminated in glass to form a pattern area, a 3D micro-texture structure is formed on the light extraction film of micron level (in most cases) or even nanometer level, and the texture area can be designed in a part of the surface of the light extraction film that needs a pattern to meet the design intent, or the texture area can cover the whole surface of the light extraction film in a uniform way or other ways to meet the design intent. The texture structure can be produced by machining or chemical etching or photoetching, and by curing of UV adhesive via transfer technology or other processes that can achieve the same result. It should be understood that the surface topology of the texture structure can be specifically designed to achieve the best diffusion efficiency under the required optimal illumination angle, and the topology can be designed with specific three-dimensional geometry and distributed in a specific way, which will not be described in detail here.

In order to achieve the lighting effect, light propagates in the light extraction film. As shown in the schematic diagram illustrated in FIG. 1, incident light propagates in, for example, a light extraction film 10 along the arrow, and diffuses when the light contacts a texture structure 11. In practical application, if the light extraction film with texture structure is laminated in glass, the overall light transmittance of glass assembly should be low in some application environments, so as to meet the light requirements of specific application environments. For example, when the glass assembly is applied to the skylight of a vehicle, the light should tend to propagate toward the interior of the vehicle rather than the exterior of the vehicle after contacting the texture structure of the light extraction film. It means that the laminated layers (two or more layers) on the side of the glass assembly on which the texture structure of the light extraction film facing the interior of the vehicle should have higher light transmittance. In other words, the laminated layers on the side from the texture structure of the light extraction film to the outside of the vehicle should have lower light transmittance. It should be noted that the higher light transmittance and the lower light transmittance here are relative to the case that the incident light propagates in the laminated layers, rather than the light transmittance change caused by the structure of each layer itself forming the laminated layers. In addition, compared with the light propagation in the light extraction film, the way of the light propagation in the glass is easier to realize. It should also be noted that the above description provides background information related to the contents of the present disclosure, but it is not meant to be prior art.

Based on the above concept, the present disclosure provides an improvement on the glass assembly. In all the described embodiments, the glass assembly includes a first glass body, a second glass body and a light extraction component sandwiched between the first glass body and the second glass body. In order to make the light at least totally reflect in the second glass body, the laminated structure and/or materials of each layer of the glass assembly are optimized. The second glass body is preferably a glass with high light transmittance, such as super-transparent glass. When the light contacts the local or whole light extraction structure on the light extraction component, the light is scattered or diffused to present the lighting effect. In addition, depending on the selection of the light extraction component, the present disclosure also provides an illumination effect, that is, when the light source is turned on, the glass assembly presents a required pattern or display effect; and when the light source is turned off, the glass assembly has different transparent effects, namely, transparent or translucent, according to the transparency of the light extraction component. This is especially beneficial to the lighting requirements of the vehicle window glass, such as vehicle skylight.

Hereinafter, the light extraction component is described in the form of a light extraction film and has a light extraction structure. The light extraction structure may be a textured light extraction structure, for example, using a micro texture, but other light-emitting structures are not excluded. It should be understood that commercially available plating layers, coatings or films with equivalent functions or effects can be used as the above-mentioned light extraction component. In addition, the shape and distribution of the light extraction component can be determined as required but not limited to those illustrated in the figures, and the thickness and material thereof are not limited. Alternatively, the light extraction film may be a single-layer film or formed by laminating multiple layers of films. As for the light extraction structure, the light extraction film can be provided with light scattering structure thereon by mechanical structuring, embossing, etching or spraying and the like as described above, and the light scattering structure can be discontinuously arranged to produce different display patterns or display effects through different distributions.

Figure 2:
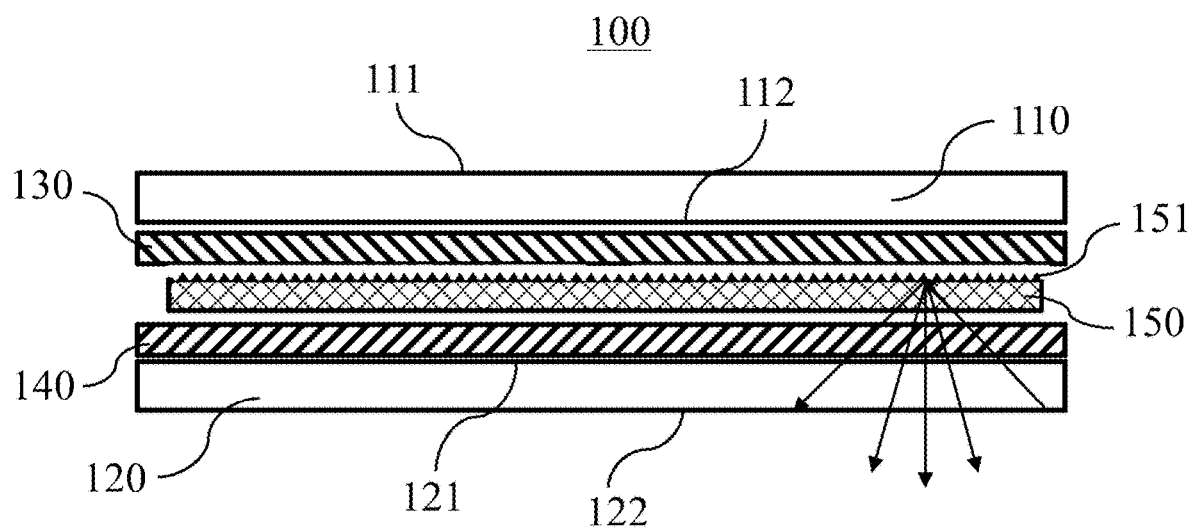
FIG. 2 is a schematic view of a glass assembly according to a first embodiment of the present disclosure.

FIG. 2 illustrates a glass assembly 100 according to a first embodiment of the present disclosure. The glass assembly 100 includes a first glass body 110 having a first surface 111 and a second surface 112, and a second glass body 120 having a third surface 121 and a fourth surface 122. For the vehicle window glass, the first glass body 110 may be called external glass, and the second glass body 120 may be called internal glass. A light extraction component 150 is sandwiched between the first glass body 110 and the second glass body 120 through a first intermediate layer 140, wherein the first intermediate layer 140 is, for example, polyvinyl butyral (PVB) or ethylene-vinyl acetate copolymer (EVA), and the first intermediate layer 140 is attached at least between the light extraction component 150 and the second glass body 120 to bond them into a whole.

According to the present disclosure, the glass assembly further includes an interlayer directly attached to the light extraction component, and the refractive index of the interlayer is smaller than that of an adjacent layer in the direction toward the second glass body, so that incident light introduced from the second glass body is totally reflected toward the second glass body and at least totally reflected in the second glass body, thereby reducing the propagation of light to the first glass body in a more easily implemented manner.

In the embodiment shown in FIG. 2, the light extraction component 150 may be in the form of a light extraction film and has a light extraction structure 151 arranged toward the first glass body 110. A second intermediate layer 130 is attached between the light extraction component 150 and the first glass body 110, wherein the refractive index n1 of the second intermediate layer 130 is advantageously configured to be smaller than the refractive index n2 of the light extraction component 150, so that total reflection occurs at the interface between the second intermediate layer 130 and the light extraction component 150. Further, n1 should be no greater than the refractive index of the glass (for example, the refractive index of the glass used in the automobile industry is about 1.51), and n1 should be less than the refractive index n3 of the first intermediate layer 140.

As an example, in the embodiment shown in FIG. 2, n2 is close to the refractive index n3 of the first intermediate layer 140, and n3 is close to the refractive index of the glass (for example, the refractive index of the glass used in the automobile industry is about 1.51). Here, "close to" means that the difference between the two refractive indexes for comparison is not more than ±0.03. With this design, the light extraction component 150, the first intermediate layer 140 and the second glass body 120 are integrally formed as a light guiding component in which the light is conducive to be totally reflected and propagated, so that the incident light can easily propagate and be totally reflected in the integrated light guiding component composed of the light extraction component 150, the first intermediate layer 140 and the second glass body 120 as indicated by the arrows, and when the light contacts the light extraction structure 151, it will be emitted out of the second glass body 120. This light propagation mode can realize no light loss or only limited light loss.

In some embodiments, the light extraction structure may be disposed toward the second glass body 120, and the light is totally reflected in the light extraction component 150, the first intermediate layer 140 and the second glass body 120. In this case, n2 is preferably configured to be smaller than n3, so that the light can be more easily emitted out of the second glass body 120 after contacting the light extraction structure 151.

Through the above design, the refractive index of the second intermediate layer facing the outside relative to the light extraction component in the glass assembly is configured to be smaller than that of the light extraction component, and the incident light entering from the second glass body is totally reflected at the interface between the second intermediate layer and the light extraction component after reaching the light extraction component, rather than entering the second intermediate layer. The incident light propagates toward the first intermediate layer and the third surface of the second glass body after being scattered or diffused by the light extraction structure, and is led out from the fourth surface of the second glass body. In this way, the glass assembly of the present disclosure avoids the light loss phenomenon caused by light propagating to the outside, and enhances the lighting effect on the inner glass.

As mentioned above, the first intermediate layer may be PVB, EVA, or alternatively, ethylene-octene polymer (POE) or other equivalents. Accordingly, the second intermediate layer can be made of a material with a lower refractive index, such as but not limited to PVB, EVA or acrylic resin, as long as the refractive index n1 of the second intermediate layer is smaller than the refractive index n3 of the first intermediate layer in different embodiments.

In a modified embodiment, the light extraction structure may be disposed toward the second glass body 120, but the glass assembly of this embodiment is different from the embodiment mentioned above with respect to FIG. 2 in which the light extraction structure may be disposed toward the second glass body 120 in that there is no restriction on the refractive index n1 of the second intermediate layer 130 attached between the light extraction component 150 and the first glass body 110. In this embodiment, the refractive index n2 of the light extraction component 150 is smaller than the refractive index n3 of the first intermediate layer 140, so that the incident light is totally reflected at the interface between the light extraction component 150 and the first intermediate layer 140. Here, n2 should not be greater than the refractive index of the glass (for example, the refractive index of the glass used in automobile industry is about 1.51). Preferably, n3 is close to the refractive index of the glass (for example, the refractive index of the glass used in the automobile industry is about 1.51). With this design, the first intermediate layer 140 and the second glass body 120 are integrally formed as a light guiding component in which the light is conducive to be totally reflected and propagated, so that the incident light introduced from the second glass body can easily propagate and be totally reflected in the integrated light guiding component composed of the first intermediate layer 140 and the second glass body 120, and when the light contacts the light extraction structure, it will be emitted out of the second glass body without light loss or with only limited light loss.

In the design of the present disclosure, the light source of the glass assembly is also improved. It should be understood that the incident angle (angle with the horizontal line) of the incident light should be as small as possible in order to make the incident light totally reflect between the light extraction component and its adjacent interlayer to enhance the lighting effect. Alternatively, the light source is, for example, a point or linear light source integrated inside the glass body, or a light source attached to the side surface of the glass body in an adjacent, attached manner, such as an LED light-emitting strip, or a point LED with a light guide. Here, the light source integrated inside the glass body should be understood as integrated inside the second glass body to be suitable for emitting the incident light from the bottom of the light extraction component. When the light source emits the light from the bottom, the light source is preferably collimated in the vertical direction to converge the light, and the incident light needs to be redirected to meet the total reflection requirement. For the light source integrated inside the glass body, depending on the size of the glass body, a redirection structure can be selectively provided.

To this end, in some embodiments, the glass assembly includes a light guiding component configured to conduct the incident light emitted by the light source toward at least the second glass body and the light extraction structure of the light extraction component.

Figure 3:
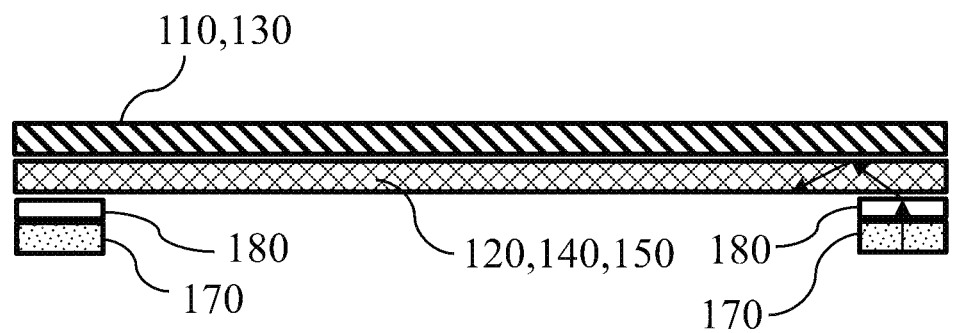
FIG. 3 is a schematic view of the arrangement of a light source and a light guiding component in the glass assembly of the embodiment shown in FIG. 2.

FIG. 3 illustrates a light source 170 and a light guiding component 180 according to an embodiment, and for the sake of simplicity, only the laminated layers for light propagation and light extraction (such as the light extraction component 150, the first intermediate layer 140 and the second glass body 120 in the first embodiment) and the laminated layers with lower light transmittance relative to the propagation of the incident light (such as the second intermediate layer 130 and the first glass body 110 in the first embodiment) are shown, and the light extraction structure is not shown. When the incident light emitted by the light source 170 propagates upward, the light guiding component 180 can adjust the direction of the light, so that the light is obliquely introduced into the laminated layers for light propagation and light extraction at a certain incident angle (as shown by the arrow in the figure), so as to be suitable for total reflection of the light at the non-light extraction structure and for scattering or diffusion of the light at the light extraction structure. It should be understood that the light guiding component can be any suitable, for example, microstructure optical device, including but not limited to grating, to realize the above adjustment of light direction. In addition, the laminated layers with lower light transmittance are not limited to the example in the above embodiment, and should cover any form that does not transmit the light, for example, only the first glass body is included in some cases.

Similarly, the laminated layers used for light propagation and light extraction are not limited to the examples in the above-mentioned embodiments, and should cover any form with higher light transmittance than the laminated layers with lower light transmittance so as to allow the light to pass through.

Figure 4:
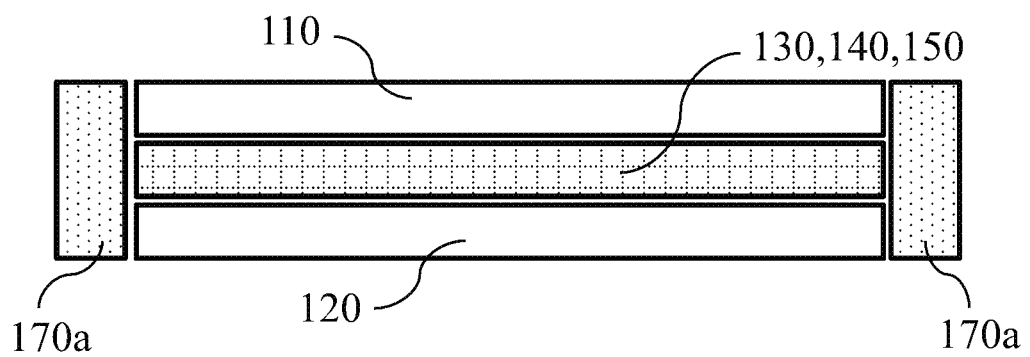
FIG. 4 is a schematic view of the arrangement of a light source in a glass assembly according to an embodiment of the present disclosure.
Figure 5:
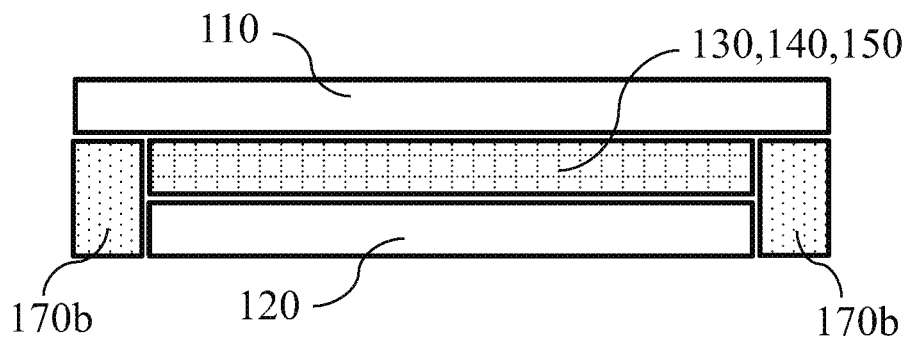
FIG. 5 is a schematic view of the arrangement of a light source in a glass assembly according to another embodiment of the present disclosure.
Figure 6:
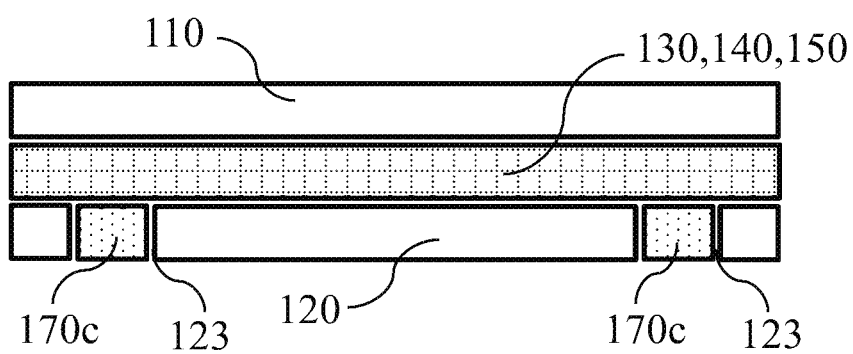
FIG. 6 is a schematic view of the arrangement of a light source in a glass assembly according to yet another embodiment of the present disclosure.

FIGS. 4 to 6 respectively illustrate different arrangements of the light source in the glass assembly. In the embodiment where the side surface of the glass assembly emits the incident light, the light source can be formed as a package (for example, encapsulated in an encapsulation) or assembled at the edge of the glass body in other fixed forms. In the embodiment shown in FIG. 4, a light source 170a may be arranged at the edges of the first glass body 110 and the second glass body 120, wherein the intermediate layer sandwiched between the first glass body 110 and the second glass body 120 may include the above-mentioned second intermediate layer 130, the first intermediate layer 140 and the light extraction component 150. In the embodiment shown in FIG. 5, the size of the first glass body 110 is greater than that of the second glass body 120. At this time, a light source 170b may be arranged only at the edge of the second glass body 120. In the embodiment shown in FIG. 6, a light source 170c is integrated into the second glass body 120 by being embedded in an opening 123 provided in the second glass body 120, and a sealing component (not shown) is provided between the opening 123 and the intermediate layer, and the corresponding opening can be provided with black ink, for example, so that the opening and the light source in the opening cannot be seen from the outside of the glass assembly. The cross section of the opening can be circular, rectangular or other suitable shapes.

It should be understood that in the above embodiments, the light sources 170a, 170b, and 170c can be one or more, for example, strip-shaped light bands arranged in a ring shape or a plurality of point-shaped light sources distributed at intervals, and the illustration is not intended as a limitation. In addition, the light source can be directly installed or combined with a light guiding component.

Based on the above concept, the present disclosure can also have the following variation: the light extraction component is attached with a coating, and the refractive index of the coating is smaller than the refractive index of the light extraction component and/or the refractive index of the first intermediate layer.

Figure 7:
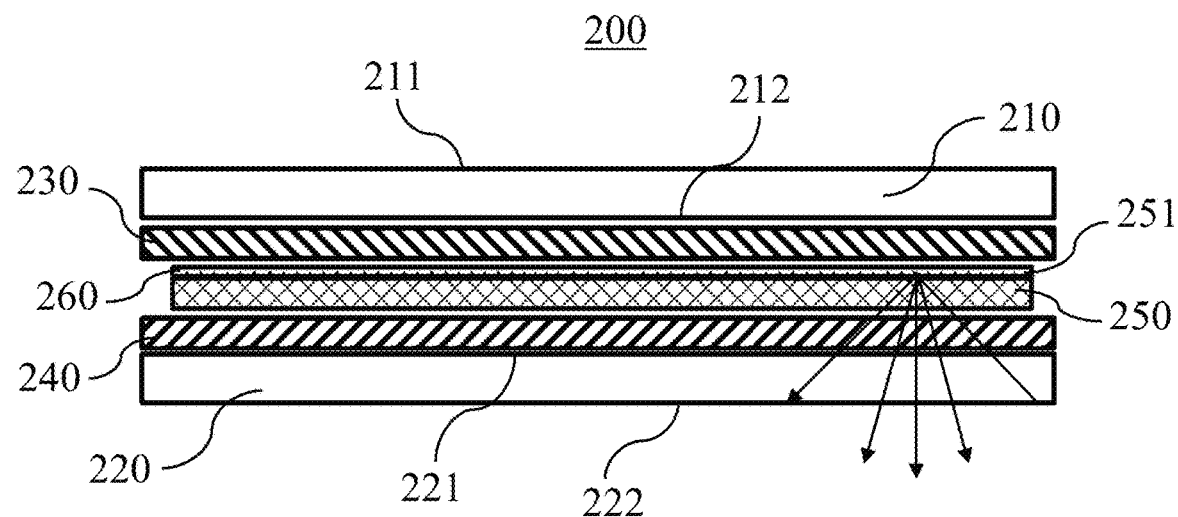
FIG. 7 is a schematic view of a glass assembly according to a second embodiment of the present disclosure.

FIG. 7 illustrates a glass assembly 200 according to a second embodiment. Similar to the first embodiment, the glass assembly 200 includes a first glass body 210 having a first surface 211 and a second surface 212, and a second glass body 220 having a third surface 221 and a fourth surface 222. A light extraction component 250 is sandwiched between the first glass body 210 and the second glass body 220 through a first intermediate layer 240, and a second intermediate layer 230 is attached between the light extraction component 250 and the first glass body 210. The light extraction component 250 has a light extraction structure 251, and the light extraction structure may be a textured light extraction structure, for example, a micro texture may be adopted. In the illustrated embodiment, the light extraction structure 251 is arranged toward the first glass body 210, and the surface of the light extraction component 250 facing the first glass body 210 is coated with a coating 260. The refractive index n4 of the coating 260 is smaller than the refractive index n2 of the light extraction component 250, so that the incident light is totally reflected at the interface between the light extraction component 250 and the coating 260. Further, n4 should be no greater than the refractive index of the glass (for example, the refractive index of the glass used in the automobile industry is about 1.51), and n4 should be less than the refractive index n3 of the first intermediate layer 240.

In the embodiment shown in FIG. 7, the light extraction structure 251 is arranged toward the first glass body 210. As an example, n2 is close to n3, and n3 is close to the refractive index of the glass (for example, the refractive index of the glass used in the automobile industry is about 1.51). Similarly, "close to" here means that the difference between the two refractive indexes for comparison is not more than ±0.03. With this design, the light extraction component 250, the first intermediate layer 240 and the second glass body 220 are integrally formed as a light guiding component in which the light is conducive to be totally reflected and propagated, so that the incident light can easily propagate and be totally reflected in the integrated light guiding component composed of the light extraction component 250, the first intermediate layer 240 and the second glass body 220 as indicated by the arrows, and then emitted out of the second glass body 220 after contacting the light extraction structure 251 without light loss or with only limited light loss. In this case, since the light does not propagate to the second intermediate layer 230 arranged between the first glass body 210 and the light extraction component 250, the refractive index of the second intermediate layer 230 may be ignored. That is, the second intermediate layer 230 may be made of the same or different materials as the first intermediate layer 240, including but not limited to PVB, EVA, POE or other equivalents. For the coating 260 with lower refractive index, a polysiloxane coating with a refractive index of 1.43 can be selected.

As can be seen in FIG. 7, the coating 260 fills the light extraction structure 251. Here, "fill" means that the coating fills the micro-texture structure so that the texture surface becomes approximately flush. For the case that the light extraction structure faces the first glass body, it is appropriate to fill the light extraction structure with the coating and make its texture surface flush. When the light extraction structure faces the second glass body, the coating formed in this way may constitute a light isolation layer, which is not conducive to the diffusion or scattering of the light by the micro-texture structure of the light extraction structure. Thus, in some embodiments, the coating may be applied by following the contour of the light extraction structure, as will be described below.

Figure 8:
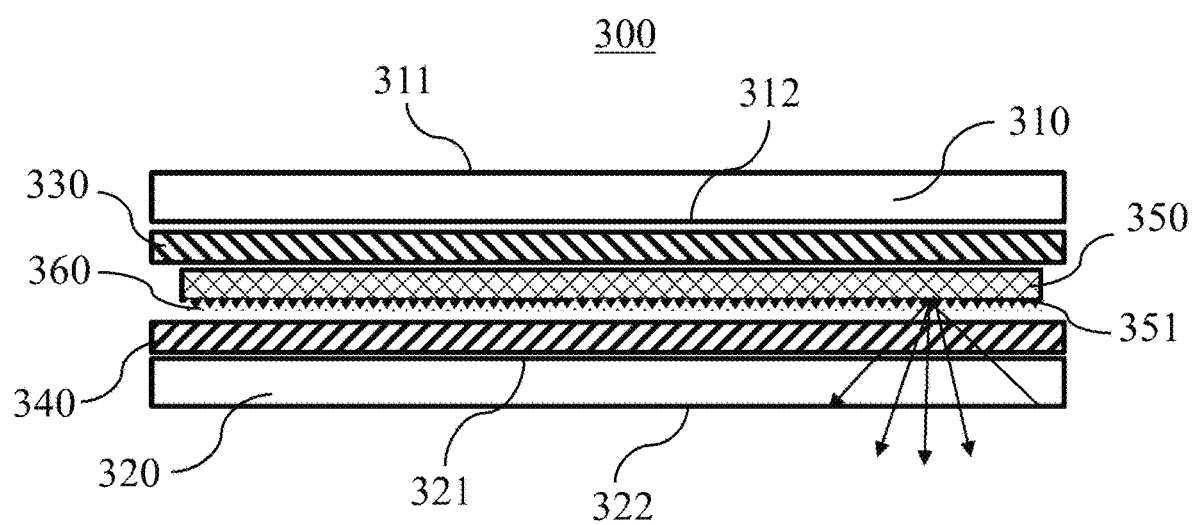
FIG. 8 is a schematic view of a glass assembly according to a third embodiment of the present disclosure.

In a glass assembly 300 of a third embodiment shown in FIG. 8, the glass assembly 300 includes a first glass body 310 having a first surface 311 and a second surface 312, and a second glass body 320 having a third surface 321 and a fourth surface 322. A light extraction component 350 is sandwiched between the first glass body 310 and the second glass body 320 through a first intermediate layer 340, and a second intermediate layer 330 is attached between the light extraction component 350 and the first glass body 310. The light extraction component 350 has a light extraction structure 351, and the light extraction structure may be a textured light extraction structure, for example, a micro texture may be adopted. In this embodiment, the light extraction structure 351 is arranged toward the second glass body 320, and a coating 360 is applied on the light extraction structure 351. The difference from the above embodiment is that the coating 360 cannot fill the light extraction structure 351, but should be applied by following its structure. That is, an interlayer similar to a protective layer formed by the coating 360 also has a texture structure, and the texture structure completely corresponds to and embodies the texture structure of the light extraction structure 351.

In this embodiment, the refractive index n4 of the coating 360 is smaller than the refractive index n3 of the first intermediate layer 340, so that the incident light is totally reflected at the interface between the coating 360 and the first intermediate layer 340. Here, n4 should not be greater than the refractive index of the glass (for example, the refractive index of the glass used in automobile industry is about 1.51). Preferably, n3 is close to the refractive index of the glass (for example, the refractive index of the glass used in the automobile industry is about 1.51). With this design, the first intermediate layer 340 and the second glass body 320 are integrally formed as a light guiding component in which the light is conducive to be totally reflected and propagated, so that the incident light can easily propagate and be totally reflected in the integrated light guiding component composed of the first intermediate layer 340 and the second glass body 320 as indicated by the arrows, and when the light contacts the texture structure formed by the coating 360 which completely corresponds to and embodies the light extraction structure 351, it will be emitted out of the second glass body 320 without light loss or with only limited light loss.

It should be understood that since the way of applying a coating on the light extraction structure following the contour of the light extraction structure will not affect the optical performance of the texture structure and form a protective layer that is conducive to the scattering or diffusion of the light at the texture structure, it is feasible to arrange the light extraction structure toward the first glass body or toward the second glass body, and it also makes the application of this design more flexible and diversified. When the light extraction structure is arranged toward the first glass body, the refractive index n4 of the coating is smaller than the refractive index n2 of the light extraction component 350, so that the incident light is totally reflected at the interface between the light extraction component 350 and the coating. Further, n4 should be no greater than the refractive index of the glass (for example, the refractive index of the glass used in the automobile industry is about 1.51), and n4 should be less than the refractive index n3 of the first intermediate layer 340. As an example, n2 is close to n3, and n3 is close to the refractive index of the glass (for example, the refractive index of the glass used in the automobile industry is about 1.51). With such a design, the light extraction component 350, the first intermediate layer 340 and the second glass body 320 are integrally formed as a light guiding component in which the light is conducive to be totally reflected and propagated. Alternatively, the coating applied following the contour of the light extraction structure can be selected from silica with a refractive index of 1.47.

As can be seen from the above description, the glass assembly of the present disclosure directly attaches the interlayer to the light extraction component, and the refractive index of the interlayer is smaller than that of the adjacent layer in the direction toward the second glass body, or makes the refractive index of the light extraction component smaller than that of the adjacent layer in the direction toward the second glass body, so that the incident light introduced from the second glass body is totally reflected toward the second glass body and at least totally reflected in the second glass body. The scattering of the incident light at the light extraction structure of the light extraction component is increased, so that the light extraction effect is increased. The illumination brightness is effectively improved while ensuring the lighting effect, which has the beneficial effects of simple process, obvious performance improvement and the like.

It should be understood here that the embodiments shown in the drawings only illustrate the optional architectures, shapes, sizes and arrangements of various optional components of the glass assembly according to the present disclosure; however, it is only illustrative rather than restrictive, and other shapes, sizes and arrangements can be adopted without departing from the spirit and scope of the present disclosure.

The technical content and technical features of the present disclosure have been disclosed above. However, it can be understood that those skilled in the art can make various changes and improvements to the above disclosed concept under the creative idea of the present disclosure, all of which fall within the protection scope of the present disclosure. The description of the above embodiments is illustrative rather than restrictive, and the protection scope of the present disclosure is determined by the claims.

The invention claimed is:

1. A glass assembly comprising:
   a first glass body having a first surface and a second surface which are oppositely arranged;
   a second glass body having a third surface facing the second surface and a fourth surface arranged oppositely to the third surface;
   a light extraction component sandwiched between the first glass body and the second glass body and comprising a light extraction structure for extracting light, and
   an interlayer directly attached to the light extraction component, and a refractive index of the interlayer is smaller than that of an adjacent layer in a direction toward the second glass body, so that incident light introduced from the second glass body propagates in the adjacent layer, is totally reflected toward the second glass body and is at least totally reflected in the second glass body.

2. A glass assembly comprising:
   a first glass body having a first surface and a second surface which are oppositely arranged;
   a second glass body having a third surface facing the second surface and a fourth surface arranged oppositely to the third surface;
   a light extraction component sandwiched between the first glass body and the second glass body and comprising a light extraction structure for extracting light, and
   an interlayer directly attached to the light extraction component, and a refractive index of the interlayer is smaller than that of an adjacent layer in a direction toward the second glass body, so that incident light introduced from the second glass body is totally reflected toward the second glass body and at least totally reflected in the second glass body,
   wherein the light extraction component is a light extraction film sandwiched between the first glass body and the second glass body through a first intermediate layer, the first intermediate layer is attached at least between the light extraction component and the second glass body, and the incident light is totally reflected at least in the second glass body and the first intermediate layer.

3. A glass assembly comprising:
   a first glass body having a first surface and a second surface which are oppositely arranged;
   a second glass body having a third surface facing the second surface and a fourth surface arranged oppositely to the third surface;

a light extraction component sandwiched between the first glass body and the second glass body and comprising a light extraction structure for extracting light;

wherein a refractive index of the light extraction component is smaller than that of an adjacent layer in a direction toward the second glass body, so that incident light introduced from the second glass body propagates in the adjacent layer, is totally reflected toward the second glass body and is at least totally reflected in the second glass body.

4. A glass assembly comprising:

a first glass body having a first surface and a second surface which are oppositely arranged;

a second glass body having a third surface facing the second surface and a fourth surface arranged oppositely to the third surface;

a light extraction component sandwiched between the first glass body and the second glass body and comprising a light extraction structure for extracting light;

wherein a refractive index of the light extraction component is smaller than that of an adjacent layer in a direction toward the second glass body, so that incident light introduced from the second glass body is totally reflected toward the second glass body and at least totally reflected in the second glass body, and wherein the light extraction component is a light extraction film sandwiched between the first glass body and the second glass body through a first intermediate layer, the first intermediate layer is at least attached between the light extraction component and the second glass body, and the light extraction structure is arranged toward the second glass body; and wherein the refractive index of the light extraction component is smaller than that of the first intermediate layer, and the incident light is totally reflected in the first intermediate layer and the second glass body.

5. The glass assembly according to claim 2, wherein a second intermediate layer is attached between the light extraction component and the first glass body, and the second intermediate layer is formed as the interlayer; and wherein a refractive index of the second intermediate layer is at least smaller than that of the light extraction component, and the incident light is totally reflected in the light extraction component, the first intermediate layer and the second glass body.

6. The glass assembly according to claim 5, wherein the second intermediate layer is selected from polyvinyl butyral, ethylene-vinyl acetate copolymer or acrylic resin.

7. The glass assembly according to claim 2, wherein the light extraction structure is arranged toward the first glass body or the second glass body.

8. The glass assembly according to claim 2, wherein the light extraction component is attached with a coating and the coating is formed as the interlayer; and wherein a refractive index of the coating is smaller than the refractive index of the light extraction component and/or a refractive index of the first intermediate layer.

9. The glass assembly according to claim 8, wherein the coating fills the light extraction structure and the light extraction structure is arranged toward the first glass body; and wherein the incident light is totally reflected in the light extraction component, the first intermediate layer and the second glass body.

10. The glass assembly according to claim 9, wherein the coating is polysiloxane.

11. The glass assembly according to claim 8, wherein the coating is applied following a contour of the light extraction structure, and the light extraction structure is arranged toward the first glass body; and wherein the incident light is totally reflected in the light extraction component, the first intermediate layer and the second glass body, or wherein the coating is applied following a contour of the light extraction structure, and the light extraction structure is arranged toward the second glass body; and wherein the incident light is totally reflected in the first intermediate layer and the second glass body.

12. The glass assembly according to claim 11, wherein the coating is silicon dioxide.

13. The glass assembly according to claim 1, further comprising a light source arranged adjacent to the edge of the first glass body and/or the second glass body or arranged at the bottom of the second glass body or embedded in the second glass body.

14. The glass assembly according to claim 13, wherein the glass assembly comprises a light guiding component configured to conduct the incident light at least toward the second glass body and the light extraction structure of the light extraction component.

15. A window assembly comprising a glass assembly according to claim 1, wherein the window assembly comprises door, window, curtain wall, vehicle window glass, airplane glass or ship glass.

16. The window assembly according to claim 15, wherein the window assembly is a vehicle window glass comprising front windshield, rear windshield, skylight glass, vehicle door glass or corner window glass, and wherein the first surface of the first glass body faces the outside of the vehicle and the fourth surface of the second glass body faces the inside of the vehicle.

17. A window assembly comprising a glass assembly according to claim 3, wherein the window assembly comprises door, window, curtain wall, vehicle window glass, airplane glass or ship glass.

18. The window assembly according to claim 17, wherein the window assembly is a vehicle window glass comprising front windshield, rear windshield, skylight glass, vehicle door glass or corner window glass, and wherein the first surface of the first glass body faces the outside of the vehicle and the fourth surface of the second glass body faces the inside of the vehicle.

19. The glass assembly according to claim 3, further comprising a light source arranged adjacent to the edge of the first glass body and/or the second glass body or arranged at the bottom of the second glass body or embedded in the second glass body.

20. The glass assembly according to claim 19, wherein the glass assembly comprises a light guiding component configured to conduct the incident light at least toward the second glass body and the light extraction structure of the light extraction component.

\* \* \* \* \*